(12) United States Patent
Kuo (10) Patent No.: US 9,513,446 B2
(45) Date of Patent: Dec. 6, 2016

(54) ASSEMBLING DEVICE FOR ASSEMBLING PLURALITY OF OPTICAL FIBERS IN OPTICAL FIBER CONNECTOR

(71) Applicant: HON HAI PRECISION INDUSTRY CO., LTD., New Taipei (TW)

(72) Inventor: Chang-Wei Kuo, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 694 days.

(21) Appl. No.: 14/014,301

(22) Filed: Aug. 29, 2013

(65) Prior Publication Data

US 2016/0216461 A1 Jul. 28, 2016

(51) Int. Cl.
*G02B 6/38* (2006.01)
*G02B 6/32* (2006.01)

(52) U.S. Cl.
CPC ............... *G02B 6/3898* (2013.01); *G02B 6/32* (2013.01); *G02B 6/3843* (2013.01); *G02B 6/3861* (2013.01); *G02B 6/3885* (2013.01)

(58) Field of Classification Search
CPC ... G02B 6/3833; G02B 6/3849; G02B 6/3846; G02B 6/3885; G02B 6/3878; G02B 6/4202; G02B 6/25; G02B 6/3847; G02B 6/352; G02B 6/4471; G02B 6/3898; G02B 6/3961; G02B 6/3843; G02B 6/32
USPC ...................................... 385/88–90, 135–139
See application file for complete search history.

(56) References Cited

U.S. PATENT DOCUMENTS

| | | | | |
|---|---|---|---|---|
| 4,208,092 A * | 6/1980 | Monaghan | ............ | G02B 6/3875 385/55 |
| 4,274,572 A * | 6/1981 | Dunn | ....................... | G02B 6/25 225/101 |
| 4,674,831 A * | 6/1987 | Bagby | .................. | G02B 6/3847 385/19 |
| 4,708,429 A * | 11/1987 | Clark | ................... | G02B 6/4202 385/91 |
| 5,440,666 A * | 8/1995 | Burek | .................. | G02B 6/4471 385/134 |
| 5,519,804 A * | 5/1996 | Burek | .................. | G02B 6/3878 385/134 |
| 5,594,820 A * | 1/1997 | Garel-Jones | ........... | G02B 6/352 385/18 |
| 6,095,695 A * | 8/2000 | Ohtsuka | ............... | G02B 6/3825 385/134 |
| 6,234,815 B1 * | 5/2001 | Omiya | .................... | B24B 37/04 439/191 |
| 6,256,448 B1 * | 7/2001 | Shahid | ................. | G02B 6/3885 385/147 |
| 6,599,032 B1 * | 7/2003 | Kurashima | .......... | G02B 6/3885 385/24 |
| 7,731,429 B2 * | 6/2010 | Ohtsuka | ............... | G02B 6/3846 385/81 |

(Continued)

*Primary Examiner* — Akm Enayet Ullah
(74) *Attorney, Agent, or Firm* — Zhigang Ma (57) ABSTRACT

An assembling device for assembling optical fibers in the main body includes a support member and a blocking member. The support member includes a top surface. The top surface defines a receiving cavity and a supporting recess communicating with the receiving room. The blocking member includes a blocking surface. The blocking member is partially received in the receiving cavity. The blocking surface is exposed in the supporting recess. The supporting recess is configured for supporting the main body and contacting distal ends of the optical fibers.

5 Claims, 8 Drawing Sheets

(56) References Cited

U.S. PATENT DOCUMENTS

| | | | | |
|---|---|---|---|---|
| 8,529,138 B2* | 9/2013 | Duis | .................... | G02B 6/3826 |
| | | | | 385/137 |
| 8,821,033 B2* | 9/2014 | Rosenberg | ............... | G02B 6/38 |
| | | | | 385/58 |
| 2006/0245694 A1* | 11/2006 | Chen | ........................ | G02B 6/32 |
| | | | | 385/71 |
| 2013/0095732 A1* | 4/2013 | Christopher | ............. | G02B 6/25 |
| | | | | 451/54 |
| 2013/0272659 A1* | 10/2013 | Hsu | ..................... | G02B 6/3849 |
| | | | | 385/74 |
| 2016/0025943 A1* | 1/2016 | Wei | ..................... | G02B 6/3833 |
| | | | | 385/134 |

\* cited by examiner

ASSEMBLING DEVICE FOR ASSEMBLING PLURALITY OF OPTICAL FIBERS IN OPTICAL FIBER CONNECTOR

BACKGROUND

1. Technical Field

The present disclosure relates to assembly technologies, and particularly to an assembling device for assembling an optical fiber connector.

2. Description of Related Art

An optical fiber connector is used in fiber-optic data transmission. The optical fiber connector includes a main body and a number of optical fibers received in the main body. The optical fibers are optically coupled with and are aligned with optical lenses formed on another mating optical fiber connector. In order to increase the optical coupling efficiency of the two optical fiber connectors, the focal point of each of the optical lenses is positioned at the distal end of each of the optical fibers. However, the optical lenses are formed on a same planar surface using an injection molding process. Accordingly, the distal ends of the optical fibers have to be positioned on a same planar surface when the optical fibers are received in the main body.

Therefore, it is desirable to provide an assembling device for assembling an optical fiber connector, which can overcome or at least alleviate the limitations described.

DETAILED DESCRIPTION

Figure 1:
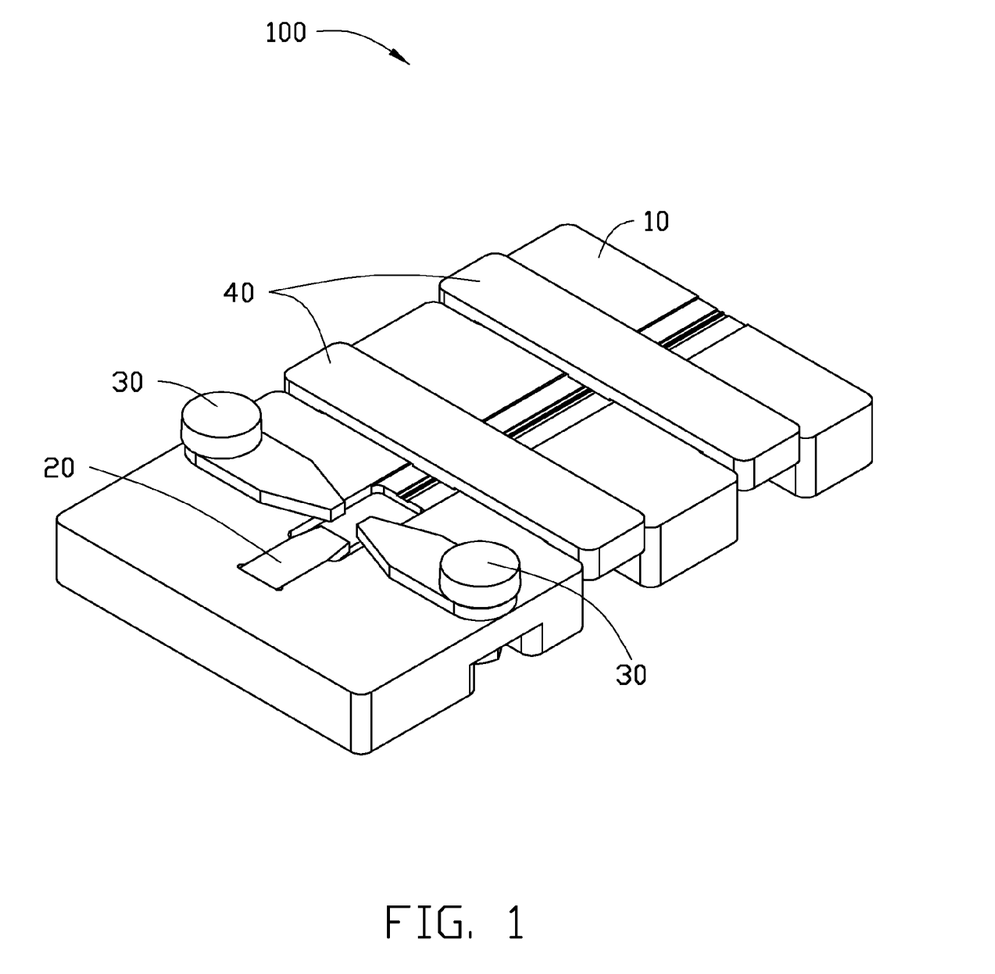
FIG. 1 is a schematic, isometric view of an assembling device for assembling an optical fiber connector, according to an exemplary embodiment.
Figure 4:
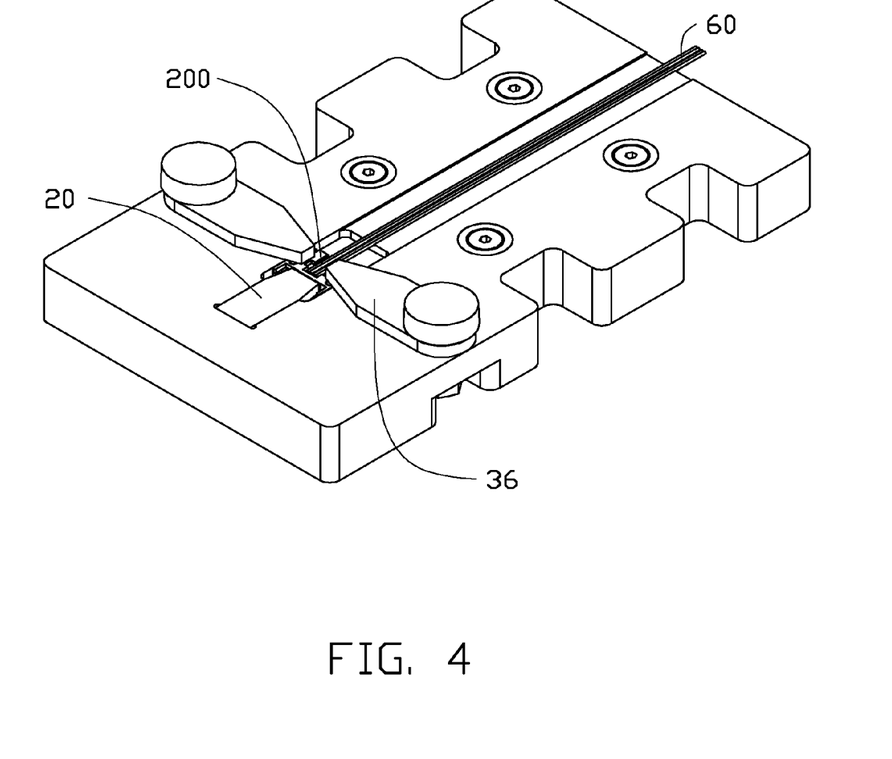
Figure 5:
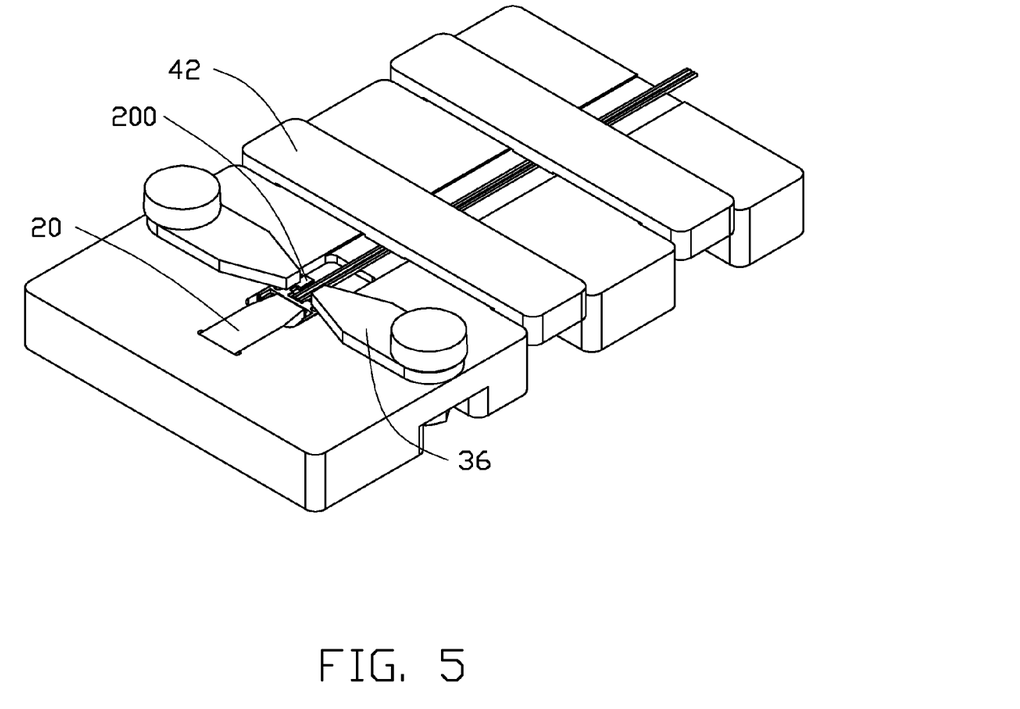

FIG. 1 shows an assembling device 100 according to an exemplary embodiment. The assembling device 100 is configured for assembling an optical fiber connector 200 (shown in FIG. 4). The assembling device 100 includes a support member 10, a blocking member 20, two fixing members 30, and two pressing members 40.

Figure 3:
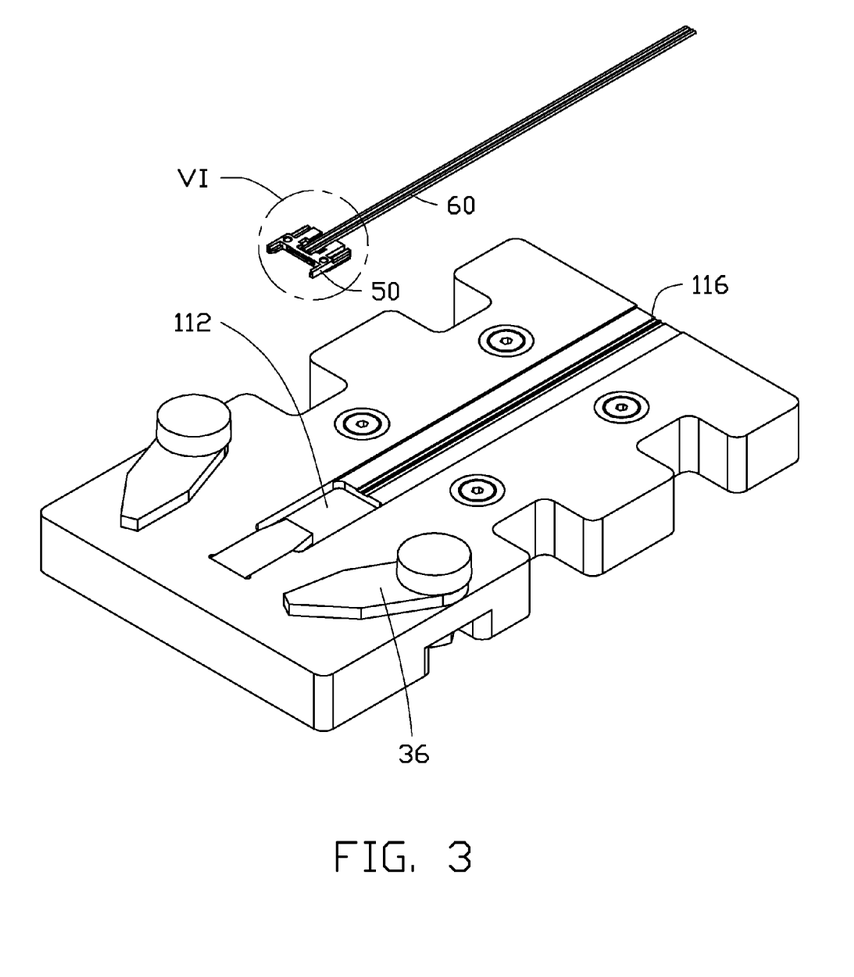
FIGS. 3-5 show successive steps of assembling the optical fiber connector using the assembling device of FIG. 1.
Figure 6:
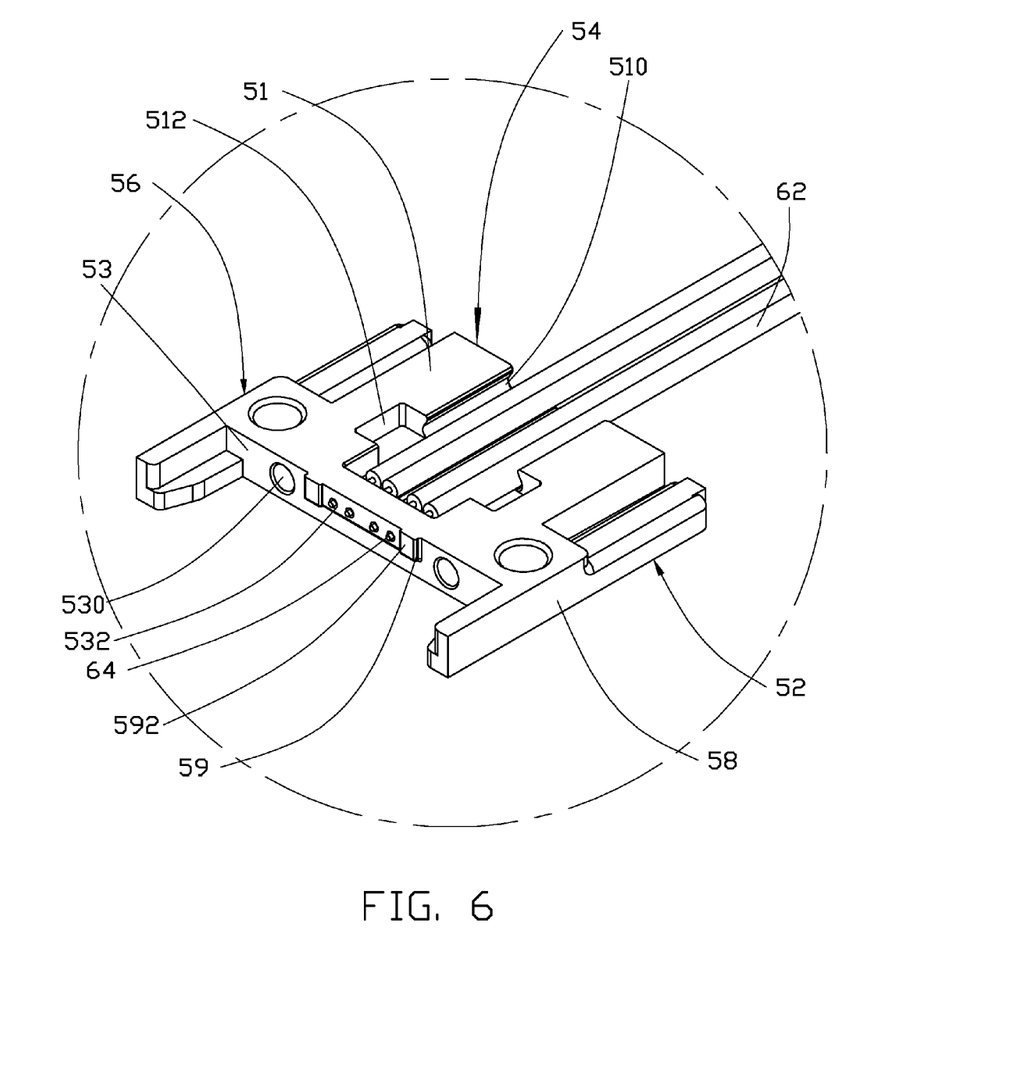
FIG. 6 is an enlarged view of a circled section VI of FIG. 3.

Referring to FIGS. 3 and 6, the optical fiber connector 200 includes a main body 50 and four optical fibers 60.

The main body 50 includes an upper surface 51, a lower surface 52, a front surface 53, a back surface 54, a first side surface 56, a second side surface 58, and two protrusions 59. The upper surface 51 and the lower surface 52 are positioned at opposite sides of the main body 50, and the upper surface 51 is substantially parallel to the lower surface 52. The front surface 53 and the back surface 54 are positioned at opposite sides of the main body 50, and the front surface 53 is substantially parallel to the back surface 54. The first side surface 56 and the second side surface 58 are positioned at opposite sides of the main body 50, and the first side surface 56 is substantially parallel to the second side surface 58. The front surface 53, the back surface 54, the first side surface 56, and the second side surface 58 are perpendicularly interconnected between the upper surface 51 and the lower surface 52.

The upper surface 51 defines a rectangular upper recess 510 and two receiving recesses 512. The upper recess 510 passes through the back surface 54, but does not reach the front surface 53. The two receiving recesses 512 are positioned at opposite sides of the upper recess 510, and are in communication with the upper recess 510. In this embodiment, the two receiving recesses 512 are symmetrical to each other across the upper recess 510.

The front surface 53 defines two locating holes 530 and four receiving holes 532. The four receiving holes 532 are arranged between the two locating holes 530 in a first straight line (not labeled). The four receiving holes 532 pass through the front surface 53 and are in communication with the upper recess 510. The longitudinal direction of each of the receiving holes 532 is perpendicular to the front surface 53.

The two protrusions 59 perpendicularly protrude from the front surface 53. Each of the protrusions 59 includes an outer surface 592 facing away the front surface 53. In this embodiment, the two outer surfaces 592 are in a same imaginary plane which is parallel to the front surface 53.

Each of the optical fibers 60 includes a main section 62 and a front section 64, both of which are substantially circular in section. Center axes of the main section 62 and the concentric front section 64 are aligned with each other. The main section 62 consists of a core portion, and a cladding portion surrounding the core portion. The front section 64 consists of the core portion, which is exposed from the main section 62. The front section 64 has a certain critical length.

Figure 2:
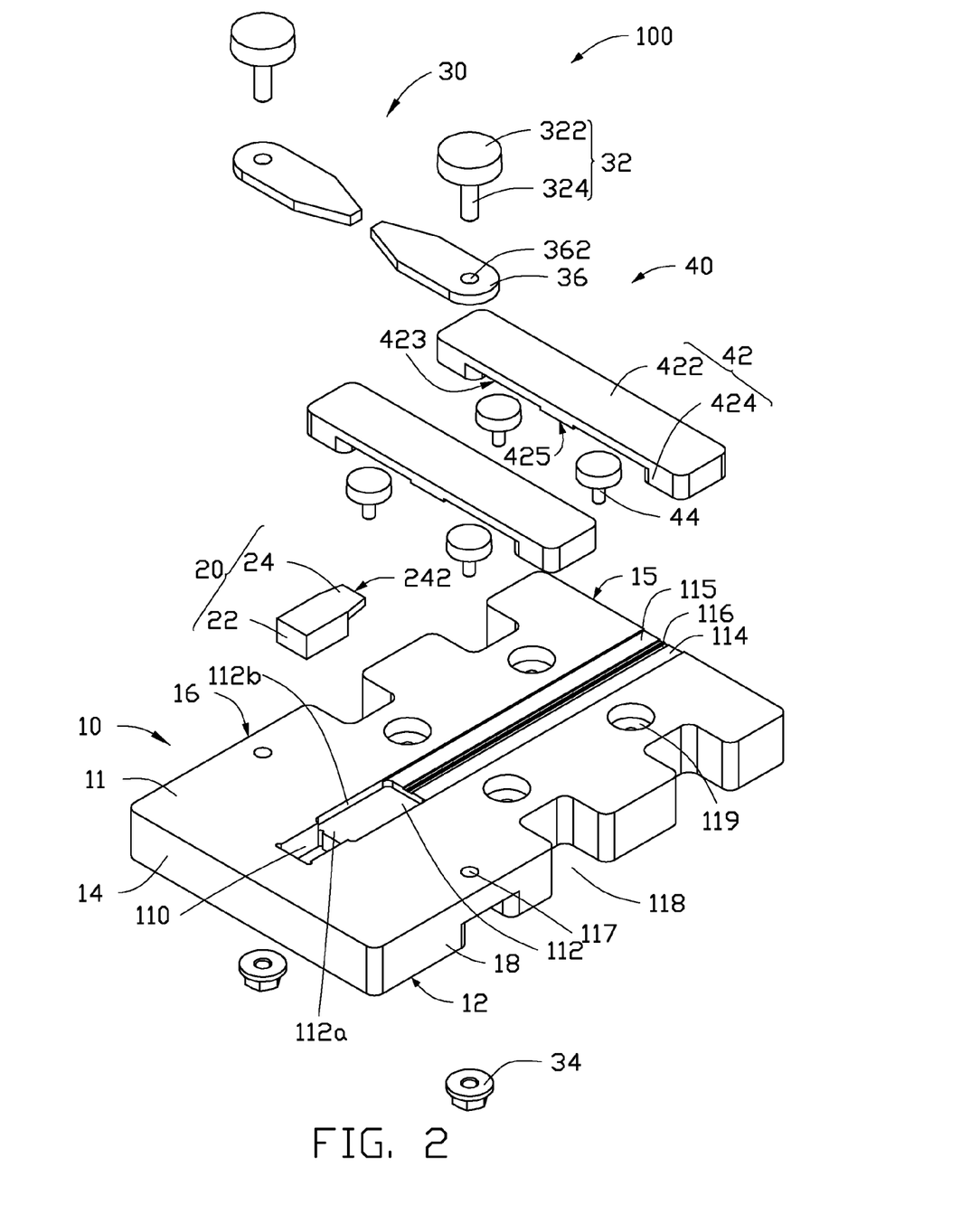
FIG. 2 is an exploded view of the assembling device of FIG. 1.

FIGS. 1 and 2 show that the support member 10 is substantially cuboid. The support member 10 includes a top surface 11, a bottom surface 12, a first surface 14, a second surface 15, a third surface 16, and a fourth surface 18. The top surface 11 and the bottom surface 12 are positioned at opposite sides of the support member 10, and the top surface 11 is substantially parallel to the bottom surface 12. The first surface 14 and the second surface 15 are positioned at opposite sides of the support member 10, and the first surface 14 is substantially parallel to the second surface 15. The third surface 16 and the fourth surface 18 are positioned at opposite sides of the support member 10, and the third surface 16 is substantially parallel to the fourth surface 18. The first surface 14, the fourth surface 18, the second surface 15 and the third surface 16 are perpendicularly connected end-to-end, and are perpendicularly interconnected between the top surface 11 and the bottom surface 12.

The top surface 11 defines a receiving cavity 110, a supporting recess 112, and an accommodating recess 114. The receiving cavity 110, the supporting recess 112, and the accommodating recess 114 are arranged along a second straight line (not labeled) from the first surface 14 to the second surface 15. In other words, the supporting recess 112 is located between and communicates with both the receiving cavity 110 and the accommodating recess 114. The depth of the receiving cavity 110 is larger than the depth of the supporting recess 112, and the depth of the supporting recess 112 is larger than the depth of the accommodating recess 114. The supporting recess 112 includes a bottom wall 112a, and two side walls 112b perpendicularly extending from the bottom wall 112a. The two side walls 112b are positioned at opposite sides of the supporting recess 112, and are parallel to the third surface 16 and the fourth surface 18. The accommodating recess 114 passes through the second surface 15. A bottom wall 115 of the accommodating recess 114 defines two receiving rooms 116. The two receiving rooms 116 are parallel to each other and communicate with the supporting recess 112. In this embodiment, the second straight line is located at a middle portion of the top surface 11.

The support member 10 further defines two through holes 117, four cutouts 118, and four blind holes 119. The two through holes 117 are located at opposite sides of the supporting recess 112, and correspond to the supporting recess 112. The four cutouts 118 are divided into two groups each having two cutouts 118, and the four blind holes 119 are divided into two groups each having two blind holes 119. Each group of the cutouts 118 corresponds to a respective group of the blind holes 119. In detail, two cutouts 118 in the same group are positioned at opposite sides of the accommodating recess 114. Two blind holes 119 in the same group are positioned at opposite sides of the accommodating recess 114 and are between the corresponding two cutouts 118. In this embodiment, the two through holes 117 are symmetrical to each other across the second straight line. Two cutouts 118 in the same group are symmetrical to each other across the second straight line. Two blind holes 119 in the same group are symmetrical to each other across the second straight line.

The blocking member 20 includes a body portion 22 and a blocking portion 24. The body portion 22 is substantially cuboid. The blocking portion 24 protrudes from one side of the body portion 22 and includes a blocking surface 242. The blocking surface 242 is a distal end surface of the blocking portion 24 and faces away from the body portion 22. The body portion 22 is received in the receiving cavity 110, with the blocking portion 24 being supported on the bottom wall 112a. The blocking surface 242 is substantially perpendicular to the longitudinal direction of each of the receiving rooms 116. In this embodiment, the blocking member 20 is made of acrylic material.

The two fixing members 30 are positioned at opposite sides of the supporting recess 112, and correspond to the two through holes 117. Each of the two fixing members 30 includes a restricting portion 32, a locking portion 34, and a fixing portion 36. The restricting portion 32 includes a cap 322, and a post 324 perpendicularly extending from the cap 322. The fixing portion 36 defines a pivot hole 362. The post 324 passes through the pivot hole 362 and the through hole 117 and is locked by the locking portion 34 at the bottom surface 12. The cap 322 presses the fixing portion 36, and the fixing portion 36 is capable of rotating around the post 324 if a force is applied to the fixing portion 36.

The two pressing members 40 are detachably mounted on the support member 10 and cross the accommodating recess 114. Each of the pressing members 40 includes a magnetic plate 42 and two magnets 44. The magnetic plate 42 includes a plate body 422 and two engagement portions 424. The plate body 422 includes a contacting surface 423 and a pressing surface 425. The contacting surface 423 and the pressing surface 425 are positioned at the same (bottom) side of the plate body 422. The pressing surface 425 protrudes from the contacting surface 423, and is positioned at the central portion of the contacting surface 423. The two engagement portions 424 extend from opposite ends of the plate body 422, and are located adjacent to two opposite ends of the contacting surface 423, respectively. The two engagement portions 424 engage in the two cutouts 118 so that the pressing member 40 is detachably mounted on the support member 10. In this situation, the contacting surface 423 contacts the top surface 11, and the pressing surface 425 extends into the accommodating recess 114. The plate body 422 faces the two blind holes 119. The magnets 44 engage in the blind holes 119. An attraction force produced between the magnetic plate 42 and the magnets 44 makes the pressing member 40 mount with maximum tightness on the support member 10. In this embodiment, the magnetic plate 42 is made of metal, such as iron (Fe).

Figure 7:
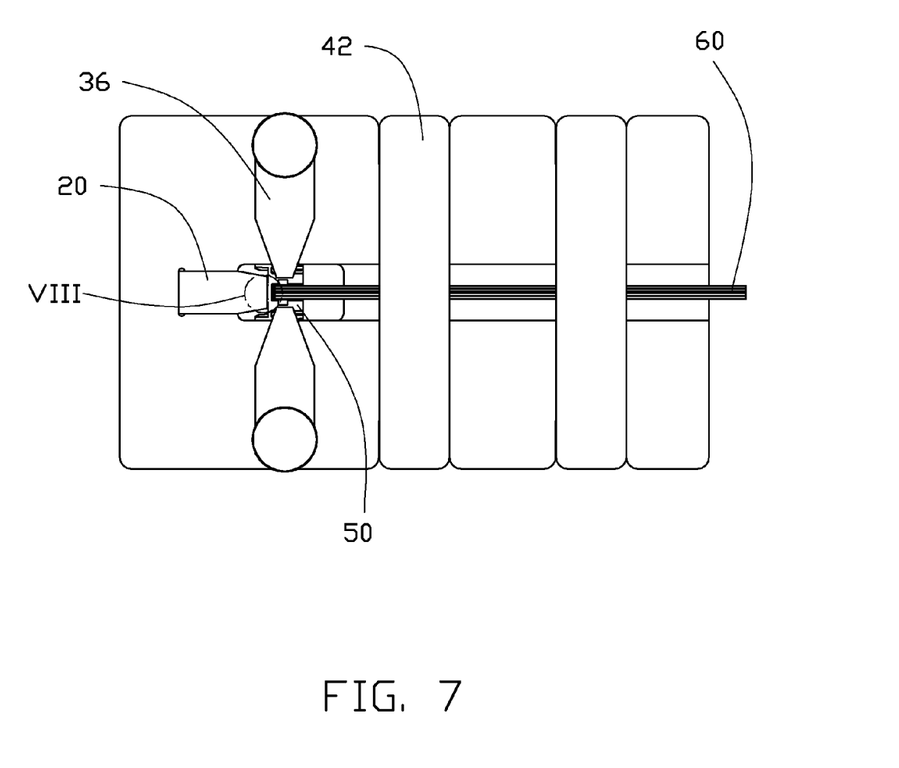
FIG. 7 is a top view of FIG. 5.
Figure 8:
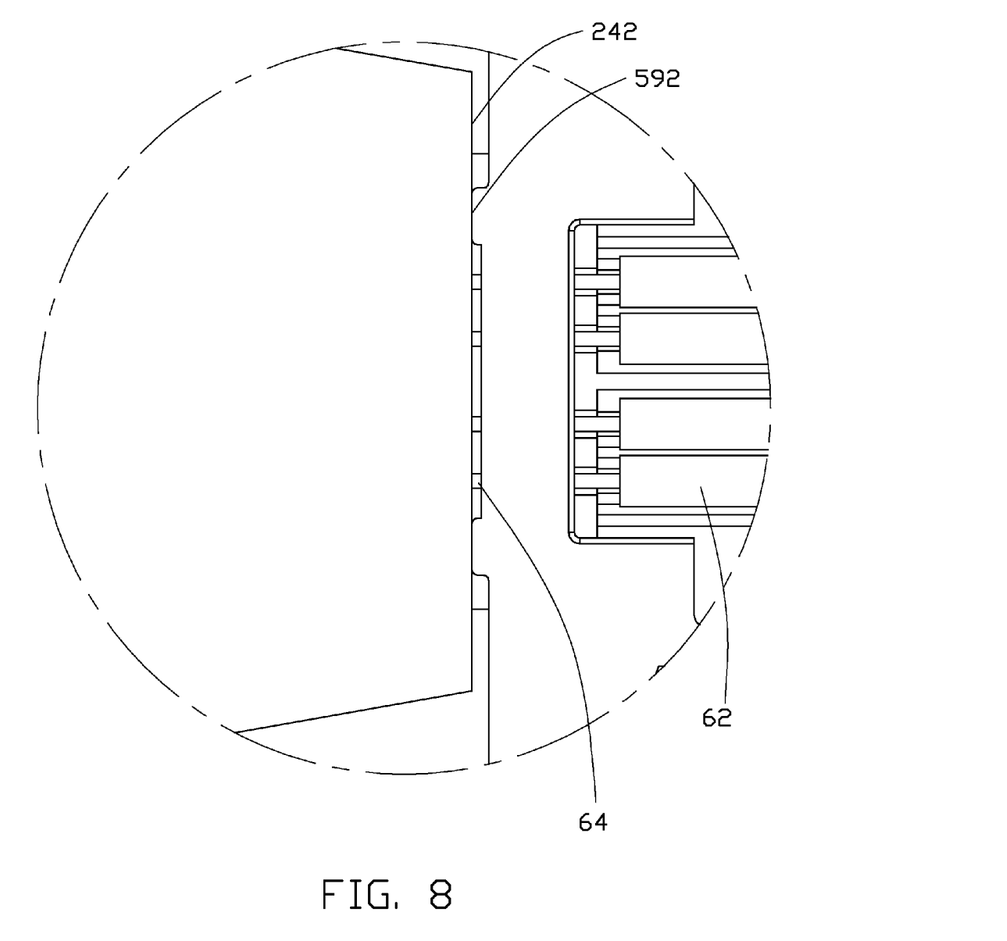
FIG. 8 is an enlarged view of a circled section VIII of FIG. 7.

FIGS. 1-6 show steps of assembling the optical fiber connector 100 using the assembling device 100. First, the two magnetic plates 42 are detached from the support member 10. The two fixing portions 36 are rotated around the posts 324 so that the fixing portions 36 are positioned clear of the supporting recess 112. Second, the four optical fibers 60 are inserted into the main body 50. In detail, the four main sections 62 are received in the upper recess 510, and the four front sections 64 pass through the four receiving holes 532 and protrude from the protrusions 59. Third, the main body 50 with the optical fibers 60 is placed on the top surface 11 from top to bottom. In detail, the main body 50 is supported on the bottom wall 112a. The portions of the main sections 62 exposed from the back surface 54 are received in the receiving rooms 116. In detail, the lower surface 52 contacts the bottom wall 112a, and the first side surface 56 and the second side surface 58 contact or abut the two side walls 112b. Each receiving room 116 receives two main sections 62. Fourth, the main body 50 with the optical fibers 60 is moved toward the blocking member 20 until the outer surfaces 592 abut against the blocking surface 242 (shown in FIGS. 7-8). In this situation, distal ends of the front sections 64 are located on the blocking surface 242. That is, the distal ends of the optical fibers 60 are located on the same surface. Fifth, the two fixing portions 36 are rotated around the posts 324 and abut the upper surface 51, thereby fixing the main body 50 in the supporting recess 112. Sixth, the two engagement portions 424 are engaged in the two cutouts 118 so that the pressing member 40 is mounted on the support member 10. In this situation, the attraction force between the magnetic plate 42 and the magnets 44 makes the pressing surface 425 abut the main section 62. Seventh, glue is applied to the optical fibers 60 in the upper recess 510. Even if the glue is used excessively, the excess glue flows harmlessly into the receiving recesses 512. In this embodiment, the glue is ultraviolet (UV) curable adhesive. Eighth, the glue is solidified, and thereby the optical fiber connector 100 is assembled. Ninth, the magnetic plate 42 is detached from the support member 10, the two fixing portions 36 are rotated around the posts 324 to be clear of the upper surface 51, and the optical fiber connector 100 is removed from the support member 10.

Even though numerous characteristics and advantages of the present embodiments have been set forth in the foregoing description, together with details of the structures and functions of the embodiments, the disclosure is illustrative only, and changes may be made in detail, especially in the matters of shape, size, and the arrangement of parts within the principles of the disclosure to the full extent indicated by the broad general meaning of the terms in which the appended claims are expressed.

What is claimed is:

1. An assembling device for assembling an optical fiber connector, the optical fiber connector comprising a main body and a plurality of optical fibers inserted in the main body, the assembling device comprising:

a support member comprising a top surface, the top surface defining a receiving cavity and a supporting recess connected to the receiving cavity, the blocking surface exposed in the supporting recess to contact distal ends of the optical fibers, and the supporting recess comprising a bottom wall to support the main body;

a blocking member comprising a blocking surface, the blocking member partially received in the receiving cavity, the blocking surface exposed in the supporting recess, and the supporting recess supports the main body of the optical fiber connector thereon such that the blocking surface contacts distal ends of the optical fibers; and two fixing members rotatably mounted on opposite sides of the supporting recess, wherein the fixing members are configured for affixing the main body in the supporting recess;

wherein the blocking member comprises a body portion and a blocking portion protruding from one side of the body portion, the body portion is received in the receiving cavity, the blocking surface is a side surface of the blocking portion facing away from the body portion, and the blocking portion is located in the supporting recess;

wherein the depth of the receiving cavity is larger than the depth of the supporting recess, and the blocking portion is supported on the bottom wall of the supporting recess;

wherein the top surface further defines an accommodating recess, the accommodating recess communicates with the supporting recess and is configured for supporting the optical fibers extending from the main body away from the blocking surface;

wherein the receiving cavity, the supporting recess, and the accommodating recess are arranged in a straight line; and wherein the support member defines two through holes at opposite sides of the supporting recess, each of the fixing members comprises a retracting portion, a locking portion, and a fixing portion, the retracting portion comprises a cap and a post extending from the cap, the fixing portion defines a pivot hole, the post passes through the pivot hole and the through hole and is locked by the locking portion, the cap presses the fixing portion, and the fixing portion is capable of rotating around the post.

2. The assembling device of claim 1, further comprising a pressing member, the pressing member is detachably mounted on the support member and crosses the accommodating recess, and the pressing member is configured for pressing the optical fibers in the accommodating recess.

3. The assembling device of claim 2, wherein the support member defines two cutouts and two blind holes, the cutouts are located at opposite sides of the supporting recess, the blind holes are located at opposite sides of the supporting recess between the two cutouts, the pressing member comprises a magnetic plate and two magnets, the magnetic plate comprises a plate body and two engagement portions extending from opposite ends of the plate body at the same side, the engagement portions engage in the cutouts, the magnets are received in the blind holes, attraction forces between the magnets and the magnetic plate press the magnetic plate on the optical fibers.

4. The assembling device of claim 3, wherein the plate body comprises a contacting surface and a pressing surface protruding from the contacting surface, the contacting surface contacts the top surface, and the pressing surface presses the optical fibers.

5. An assembling device for assembling a plurality of optical fibers in an optical fiber connector comprising a main body, the assembling device comprising:

a support member comprising a top surface, the top surface defining a receiving cavity and a supporting recess connected to the receiving cavity, the blocking surface exposed in the supporting recess to contact distal ends of the optical fibers, and the supporting recess comprising a bottom wall to support the main body;

a blocking member comprising a blocking surface, the blocking member partially received in the receiving cavity, the blocking surface exposed in the supporting recess, and the supporting recess supports the main body of the optical fiber connector thereon such that the blocking surface contacts distal ends of the optical fibers; and two fixing members rotatably mounted on opposite sides of the supporting recess, wherein the fixing members are configured for affixing the main body in the supporting recess;

wherein the support member defines two through holes at opposite sides of the supporting recess, each of the fixing members comprises a retracting portion, a locking portion, and a fixing portion, the retracting portion comprises a cap and a post extending from the cap, the fixing portion defines a pivot hole, the post passes through the pivot hole and the through hole and is locked by the locking portion, the cap presses the fixing portion, and the fixing portion is capable of rotating around the post.

* * * * *